(12) United States Patent
Hu et al.

(10) Patent No.: US 8,580,446 B2
(45) Date of Patent: Nov. 12, 2013

(54) RECYCLER, WATER MANAGEMENT SYSTEM OF FUEL CELL COMPRISING THE SAME, FUEL CELL COMPRISING THE WATER MANAGEMENT SYSTEM, AND METHOD OF MEASURING WATER LEVEL

(75) Inventors: Lei Hu, Yongin-si (KR); Hye-jung Cho, Anyang-si (KR); Young-jae Kim, Seoul (KR)

(73) Assignee: Samsung SDI Co., Ltd., Yongin-Si, Gyeonggi-Do (KR)

( * ) Notice: Subject to any disclaimer, the term of this patent is extended or adjusted under 35 U.S.C. 154(b) by 260 days.

(21) Appl. No.: 12/929,751

(22) Filed: Feb. 14, 2011

(65) Prior Publication Data
US 2011/0217604 A1   Sep. 8, 2011

(30) Foreign Application Priority Data
Mar. 4, 2010   (KR) .................. 10-2010-0019564

(51) Int. Cl.
*H01M 8/06* (2006.01)
(52) U.S. Cl.
USPC .......................................... 429/415

(58) Field of Classification Search
None
See application file for complete search history.

(56) References Cited

U.S. PATENT DOCUMENTS

| | | | |
|---|---|---|---|
| 6,495,071 B1 * | 12/2002 | Yokota et al. | ................. 252/578 |
| 2007/0264553 A1 | 11/2007 | Noh et al. | |
| 2009/0087699 A1 | 4/2009 | Takemoto et al. | |
| 2009/0087703 A1 | 4/2009 | Joung et al. | |

FOREIGN PATENT DOCUMENTS

KR   10 2009-003287 A   4/2009

* cited by examiner

*Primary Examiner* — Cynthia K. Walls
(74) *Attorney, Agent, or Firm* — Lee & Morse, P.C.

(57) ABSTRACT

A recycler of a fuel cell includes two electrodes, a rotor interposed between the two electrodes, and an insulating container surrounding and receiving the two electrodes and the rotor. A water management system of the fuel cell includes the recycler, and the fuel cell includes the water management system. A method of measuring a water level in the recycler includes measuring a conductivity of water separated in the recycler is measured.

20 Claims, 6 Drawing Sheets

RECYCLER, WATER MANAGEMENT SYSTEM OF FUEL CELL COMPRISING THE SAME, FUEL CELL COMPRISING THE WATER MANAGEMENT SYSTEM, AND METHOD OF MEASURING WATER LEVEL

BACKGROUND

1. Field

Embodiments relate to fuel cells, and more particularly, to recyclers of fuel cells, water management systems of the fuel cells including the recyclers, fuel cells including the water management systems, and methods of measuring a water level.

2. Description of the Related Art

Direct methanol fuel cells (DMFCs) may generate power by directly using fuel, e.g., methanol. The DMFCs generally use fuel diluted by water. For the dilution of methanol, water generated as a by-product during power generation in the fuel cell may be used.

An appropriate concentration of methanol is maintained for stably driving the DMFCs. In order to appropriately maintain the concentration of methanol, the water generated as a by-product during power generation may be used. Accordingly, management for the water generated as a by-product during power generation is accomplished.

Directions of fuel cells may be fixed or vary according to devices on which the fuel cells are installed. Thus, directivity of the water generated as by-product during power generation may vary according to directivity of the fuel cells. In this regard, collected amounts of water generated as by-product during power generation may not be uniform. If the collected amounts of water are not uniform, the concentration of methanol may vary and consequently, stability of driving fuel cells may be affected.

SUMMARY

Embodiments are therefore directed to water management systems of fuel cells, which substantially overcome one or more of the problems due to the limitations and disadvantages of the related art.

Provided are recyclers of fuel cells that are not affected by directivity of the fuel cells, temperature, and humidity.

Provided are water management systems of fuel cells including the recyclers.

Provided are fuel cells including the water management systems.

Provided are methods of measuring water level by using the water management systems.

Additional aspects will be set forth in part in the description which follows and, in part, will be apparent from the description, or may be learned by practice of the presented embodiments.

According to an aspect of the embodiments, a recycler of a fuel cell includes first and second electrodes; a rotor interposed between the first and second electrodes, and an insulating container surrounding and receiving the first and second electrodes and the rotor.

The recycler may further include a container cover. The first and second electrodes may each be formed of a conductive material.

The rotor may separate a gas entered through a stack and including water vapor into a gas and a liquid. The liquid may be water or may include water and fuel. The gas may include $CO_2$.

According to an aspect of the embodiments, a water management system includes a heat exchanger; a recycler, and a controller. Wherein the recycler includes first and second electrodes, a rotor interposed between the first and second electrodes; and an insulating container surrounding and receiving the first and second electrodes and the rotor.

The controller may include a water level sensor for measuring a conductivity of water separated in the recycler, a temperature sensor for measuring a temperature of the water separated in the recycler, a feedback controller for generating a driving signal to be supplied to the heat exchanger according to the measured conductivity of the water, and a fan driver for controlling operation of the heat exchanger according to the driving signal generated by the feedback controller.

The controller may further include a calibrator for calibrating the conductivity of the separated water according to the temperature measured by the temperature sensor.

According to an aspect of the embodiments, a fuel cell includes a fuel cartridge, a stack, a fuel supply system, and a water management system. Wherein the water management system includes a heat exchanger, a recycler, and a controller. The recycler including first and second electrodes, a rotor interposed between the first and second electrodes, and an insulating container surrounding and receiving the first and second electrodes and the rotor.

According to an aspect of the embodiments, a circuit for measuring a water level of a recycler in a fuel cell includes a recycler, and a load connected to the recycler and providing a reference conductivity. Wherein the recycler includes first and second electrodes, a rotor interposed between the first and second electrodes, and an insulating container surrounding and receiving the first and second electrodes and the rotor, and one end of the load is connected to the first electrode of the recycler.

A voltage may be applied between another end of the load and the second electrode of the recycler, and an output voltage may be measured between the recycler and the load.

According to an aspect of the embodiments, a method of measuring a water level of a recycler in a fuel cell includes measuring a level of water separated in the recycler above.

The method may further include measuring a temperature T1 of the water separated in the recycler and adjusting a level of water according to the measured temperature T1 of the separated water.

The measuring of the level of water may include applying a voltage Vc to the recycler, measuring a set reference temperature of the water separated in the recycler and an output voltage Vo according to the applied voltage Vc, and measuring the conductivity Go of the water separated in the recycler.

The adjusting of the level of water according to the measured temperature T1 of the separated water may further include calculating conductivity G1 from the measured temperature T1.

The method may further include controlling an operation of the heat exchanger according to the adjusted level of water after adjusting the level of water according to the measured temperature T1.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
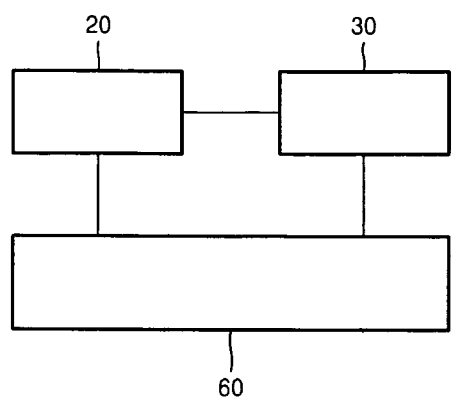
FIG. 1 illustrates a block diagram of a water management system of a fuel cell according to an exemplary embodiment.

Korean Patent Application No. 10-2010-0019564, filed on Mar. 4, 2010, in the Korean Intellectual Property Office, and entitled: "Recycler, Water Management System of Fuel Cell Comprising the Same, Fuel Cell Comprising the Water Management System, and Method of Measuring Water Level," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Hereinafter, a recycler according to an embodiment of the present invention, a water management system of a fuel cell including the recycler, a fuel cell including the water management system, and a method of measuring water level will be described in more detail with reference to the accompanying drawings. In the drawings, the thicknesses of layers and regions may be exaggerated for clarity.

Firstly, a water management system according to an exemplary embodiment is described.

Referring to FIG. 1, a water management system of a fuel cell may include a heat exchanger 20, a recycler 30, and a controller 60. The heat exchanger 20 cools by-products generated during power generation of a stack of a fuel cell from which power is generated. The by-products cooled by the heat exchanger 20 may flow into the recycler 30. The by-products are generated from a cathode and anode of the stack and may be, e.g., water vapor ($H_2O$), $CO_2$, and/or air remaining after reactions have occurred in the cathode. The recycler 30 may be referred to as a water collector or a water regenerator, and may supply water needed to dilute fuel such as methanol. The recycler 30 separates by-products entering through the heat exchanger 20 into a gas and a liquid. The gas separated by the recycler 30 is discharged and the liquid may be reused in power generation. Excess liquid other than liquid needed in power generation may be discharged. The liquid separated in the recycler 30 may be water.

The anode of the stack may be connected to the recycler 30. In this case, diluted fuel remaining in the anode during power generation may enter into the recycler 30. Accordingly, the liquid separated in the recycler 30 may include diluted fuel. Hereinafter, for convenience of description, the liquid separated in the recycler 30 is referred to as water.

The controller 60 controls operation of the heat exchanger 20. Also, the controller 60 may sense a level of the water separated by the recycler 30, e.g., an amount of the water, and measure the temperature of water discharged from the recycler 30, thereby allowing for calibrating of the sensed amount of water. The controller 60 may control operation of the heat exchanger 20 according to the sensed amount of water.

Figure 2:
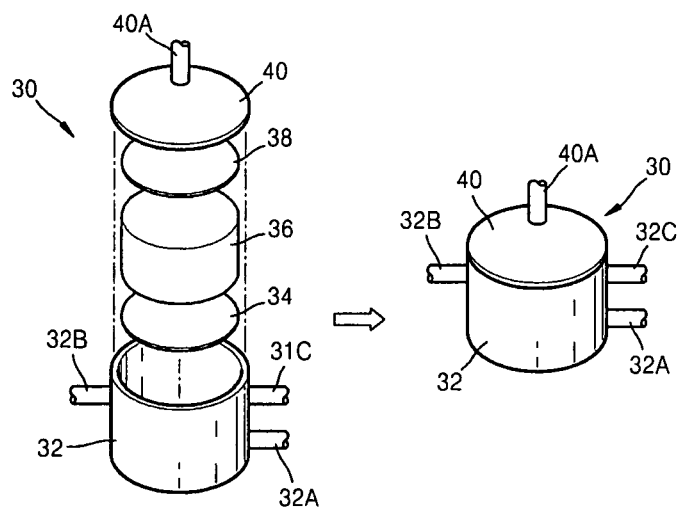
FIG. 2 illustrates a perspective view and a combined view of a recycler included in the water management system of FIG. 1, according to an exemplary embodiment.

FIG. 2 is a perspective view and a combined view of the recycler 30 included in the water management system of FIG. 1, according to an embodiment.

Referring to FIG. 2, the recycler 30 may include a container 32, a first electrode 34, a rotor 36, a second electrode 38, and a cover 40. The first electrode 34 may be a bottom electrode and may have a form similar to or the same as a bottom surface of the container 32. The first electrode 34 may be formed of a metal or any of other materials having a high conductivity. The first electrode 34 may have excellent corrosion resistance with respect to a fuel, e.g., a diluted methanol solution. The rotor 36 may be driven by a motor (not illustrated) and may apply a centrifugal force to the by-products or the diluted fuel entered into the recycler 30 from the stack. The by-products or the diluted fuel may enter the recycler 30 between the rotor 36 and the container 32, and may be affected by friction due to surface tension and rotation of the rotor 36. The by-products or the diluted fuel is affected by a force, e.g., a centrifugal force, due to the rotation of the rotor 36. Accordingly, water, having a relatively high density, is collected on the inner wall of the container 32 and gas, having a relatively low density, may be collected at the center of the container 32 to be discharged. The second electrode 38 may include a hole (not illustrated) for discharging gas and the cover 40 may include an outlet 40A for discharging gas. The outlet 40A may be connected to the hole included in the second electrode 38. Also, the container 32 may provide an outlet 32A for discharging the separated water. Also, the container 32 may provide an inlet 32B through which the by-product generated in the cathode of the stack is entered into the container 32. Also, the container 32 may provide an inlet 32C through which the by-product generated in the anode of the stack is entered into the container 32. The second electrode 38 may be a top electrode and may be disposed on the rotor 36. The material for forming the second electrode 38 may be the same as that of the first electrode 34. The first and second electrodes 34 and 38 may be spaced apart from the rotor 36. The cover 40 may be a cover for the container 32.

Figure 5:
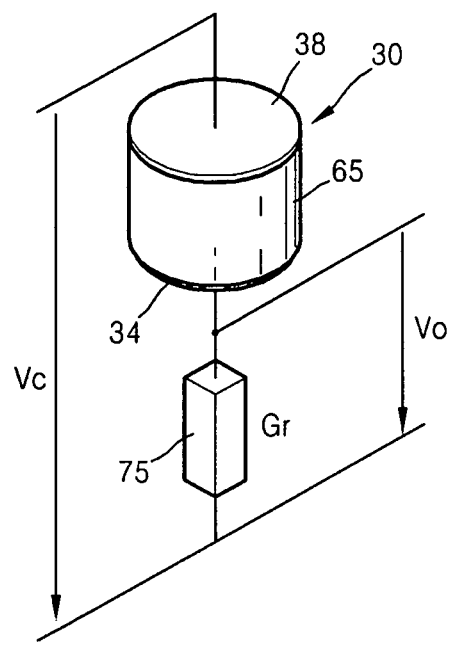
FIG. 5 illustrates a diagram of a circuit for measuring the conductivity of water separated in a recycler, according to an embodiment of the present invention.

As described above, the container 32 may surround the first and second electrodes 34 and 38 and the rotor 36, and a predetermined volume of the separated water (not illustrated) may exist inside the container 32 during the separating of gas and liquid. The container 32 may be formed of an insulating material, e.g., an insulating material having excellent corrosion resistance with respect to fuel, in particular, a methanol solution diluted by water. The conductivity of the separated water existing in the container 32 may be measured by applying a voltage to the first and second electrodes 34 and 38. As illustrated in FIG. 5, a voltage may be applied to the first electrode 34 through a load 75.

Figure 3:
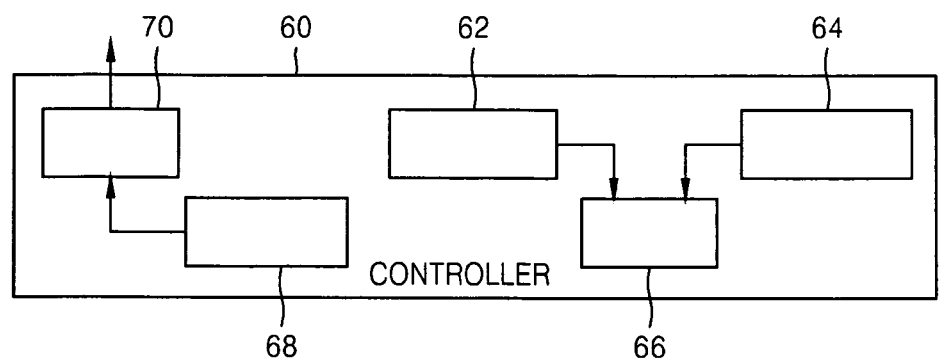
FIG. 3 illustrates a block diagram of a controller included in the water management system of FIG. 1, according to an exemplary embodiment.

FIG. 3 is a block diagram of the controller 60 included in the water management system of FIG. 1, according to an exemplary embodiment.

Referring to FIG. 3, the controller 60 may include a water level sensor 62, a temperature sensor 64, a calibrator 66, a feedback controller 68, and a fan driver 70. The water level sensor 62 may apply a voltage to the first and second electrodes 34 and 38, measure the conductivity of water separated in the recycler 30, and sense an amount of the water separated in the recycler 30 based on the conductivity. The temperature sensor 64 measures the temperature of water discharged from the recycler 30 and may be, e.g., a thermistor. The calibrator 66 calibrates a value corresponding to the amount of water measured by the water level sensor 62 based on the temperature measured by the temperature sensor 64. The value calibrated by the calibrator 66 is provided to the feedback controller 68. The feedback controller 68 applies a driving signal to the fan driver 70 according to the calibrated value provided from the calibrator 66. The fan driver 70 controls operation of the heat exchanger 20 based on the driving signal provided from the feedback controller 68.

Figure 4:
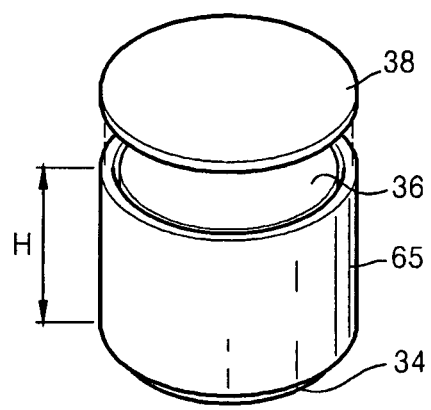
FIG. 4 illustrates a perspective view of water separated in a container by rotation of a rotor in the recycler of FIG. 2 and electrodes used to measure the conductivity of the separated water.

FIG. 4 is a perspective view of water 65 separated in the container 32 of FIG. 2 by the rotation of the rotor 36 in the recycler 30 and the first and second electrodes 34 and 38 used to measure the conductivity of the separated water 65.

Referring to FIG. 4, the separated water 65 has a height H and an area contacting the second electrode 38. Accordingly, the electrical resistance of the separated water 65 may be represented as $\rho \times (height/area)$. Here, the height is the height H of the separated water 65 and the area is the area of the separated water 65 contacting the second electrode 38. The area is obtained by volume/height. Accordingly, the electrical resistance may be represented as $\rho \times (height^2/volume)$.

Conductivity G is 1/resistance. Thus, the conductivity G is represented as $volume/(\rho \times height^2)$. $\rho$ is a specific constant of a medium and the height H has a regular value. Thus, $1/(\rho \times height^2)$ may be substituted by a constant k.

Accordingly, the conductivity G may be represented as follows.

$$G = k \times volume$$

The volume of water separated in the recycler 30 is not related to directivity. Thus, the conductivity of separated water is also not related to directivity. That is, the conductivity of water separated in the recycler 30 may not be affected by directivity of a fuel cell or directivity of the recycler 30. Accordingly, if the conductivity of the water 65 separated in the recycler 30 is measured, an amount of the water 65 may be measured regardless of the directivity of the recycler 30.

FIG. 5 is a diagram of a circuit for measuring the conductivity of water separated in the recycler 30, according to an exemplary embodiment. For convenience of description, the container 32 is not illustrated in the recycler 30.

Referring to FIG. 5, the recycler 30 is connected in series to the load 75 having a reference conductivity Gr. One end of the load 75 is connected to the first electrode 34 of the recycler 30, and a relatively low voltage is applied to the other end of the load 75. The other end of the load 75 may be grounded. A voltage Vc is applied between the second electrode 38 of the recycler 30 and the other end of the load 75 for measuring the conductivity of the recycler 30, that is, the conductivity of the separated water 65. An output voltage V0 is measured between the recycler 30 and the load 75.

In the circuit of FIG. 5, a conductivity Go of the water 65 separated in the recycler 30 may be obtained by using Formula 1 below at a reference temperature To.

$$Go = Gr \times Vo/(Vc - Vo) \quad \text{[Formula 1]}$$

Figure 6:
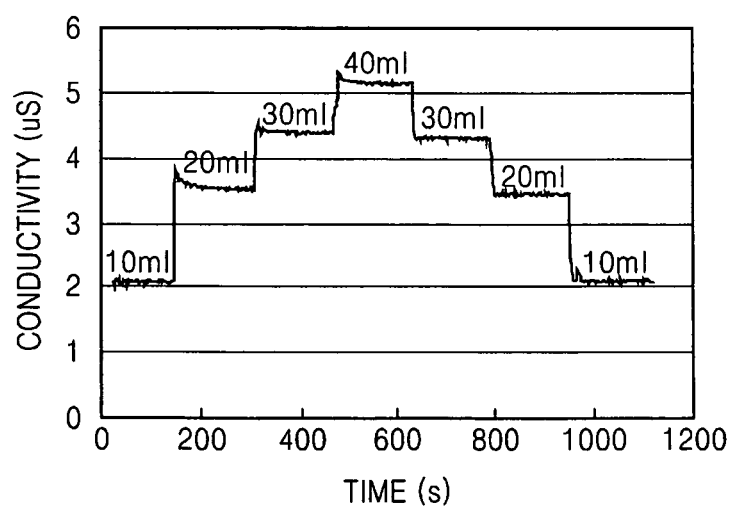
FIG. 6 illustrates a graph showing the relationship between the conductivity of water separated in the recycler and amounts of the separated water.

FIG. 6 is a graph showing the relationship between the conductivity of water separated in the recycler 30 and amounts of the separated water. In FIG. 6, a horizontal axis denotes time and a vertical axis denotes conductivity. Figures written on each step of the graph denote measured amounts of water.

Referring to FIG. 6, if the conductivity is relatively high, the amount of separated water is relatively great. If the conductivity is relatively low, the amount of separated water is relatively small. In the results shown in FIG. 6, a change of the conductivity with respect to the separated water accurately indicates a change of the amount of separated water.

Figure 7:
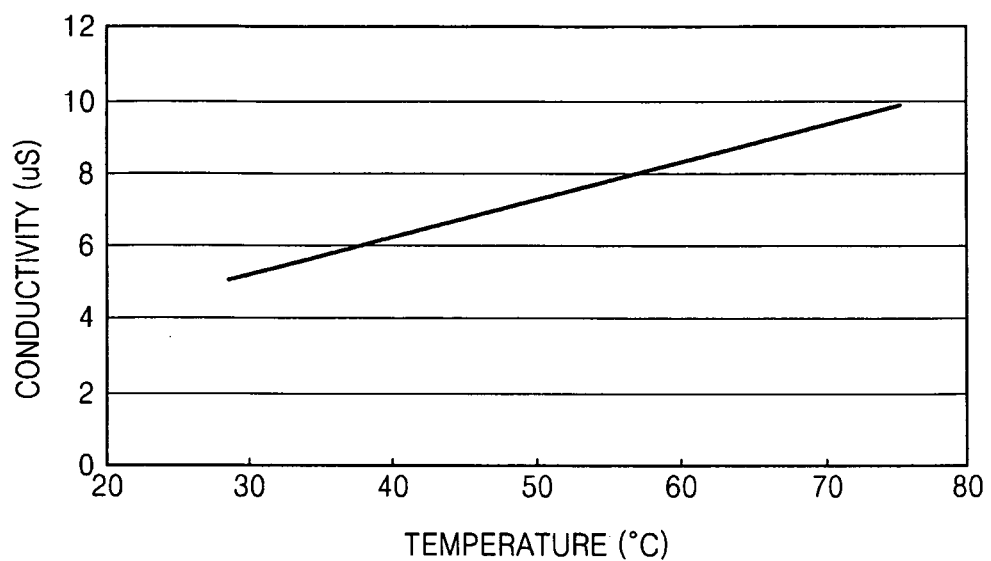
FIG. 7 illustrates a graph showing a change of the conductivity of separated water according to the temperature of the separated water in the recycler.

FIG. 7 is a graph showing a change of the conductivity of separated water according to the temperature of the water separated in the recycler 30. The temperature of the separated water may be identified by measuring the temperature of water discharged from the recycler 30. The temperature of water discharged from the recycler 30 may be measured by using the temperature sensor 64 of the controller 60.

Referring to FIG. 7, the conductivity of separated water may be in proportion to the temperature of the separated water. Accordingly, when the temperature of the separated water is changed from the reference temperature To to a temperature T1, a conductivity G1 of the separated water may be calculated by using Formula 2 below.

$$G1 = k_t \times (T1 - To) + Go \quad \text{[Formula 2]}$$

In Formula 2, $k_t$ is a temperature coefficient. For example, $k_t \approx 0.1$.

Figure 8:
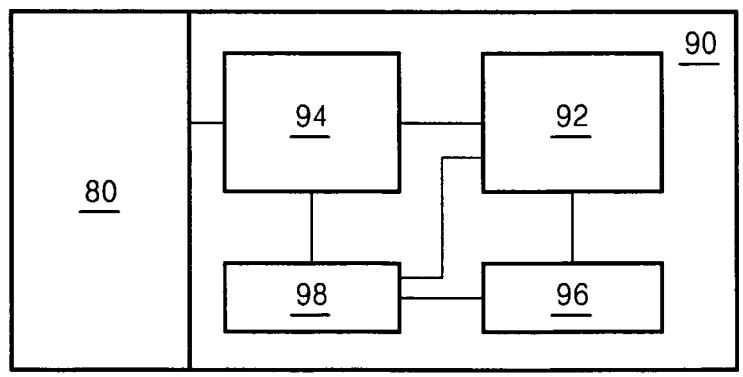
FIG. 8 illustrates a block diagram of a fuel cell, according to an embodiment of the present invention.

FIG. 8 is a block diagram of a fuel cell, according to an exemplary embodiment.

Referring to FIG. 8, the fuel cell includes a cartridge 80 and a power unit 90. The power unit 90 includes a stack 92, a fuel supply system 94, a water management system 96, and a controller 98. Wherein the stack 92 generates power and the fuel supply system 94 supplies fuel to the stack 92 from the cartridge 80. The water management system 96 may be the same as the water management system of FIG. 1 including the recycler 30 illustrated in FIG. 2.

Figure 9:
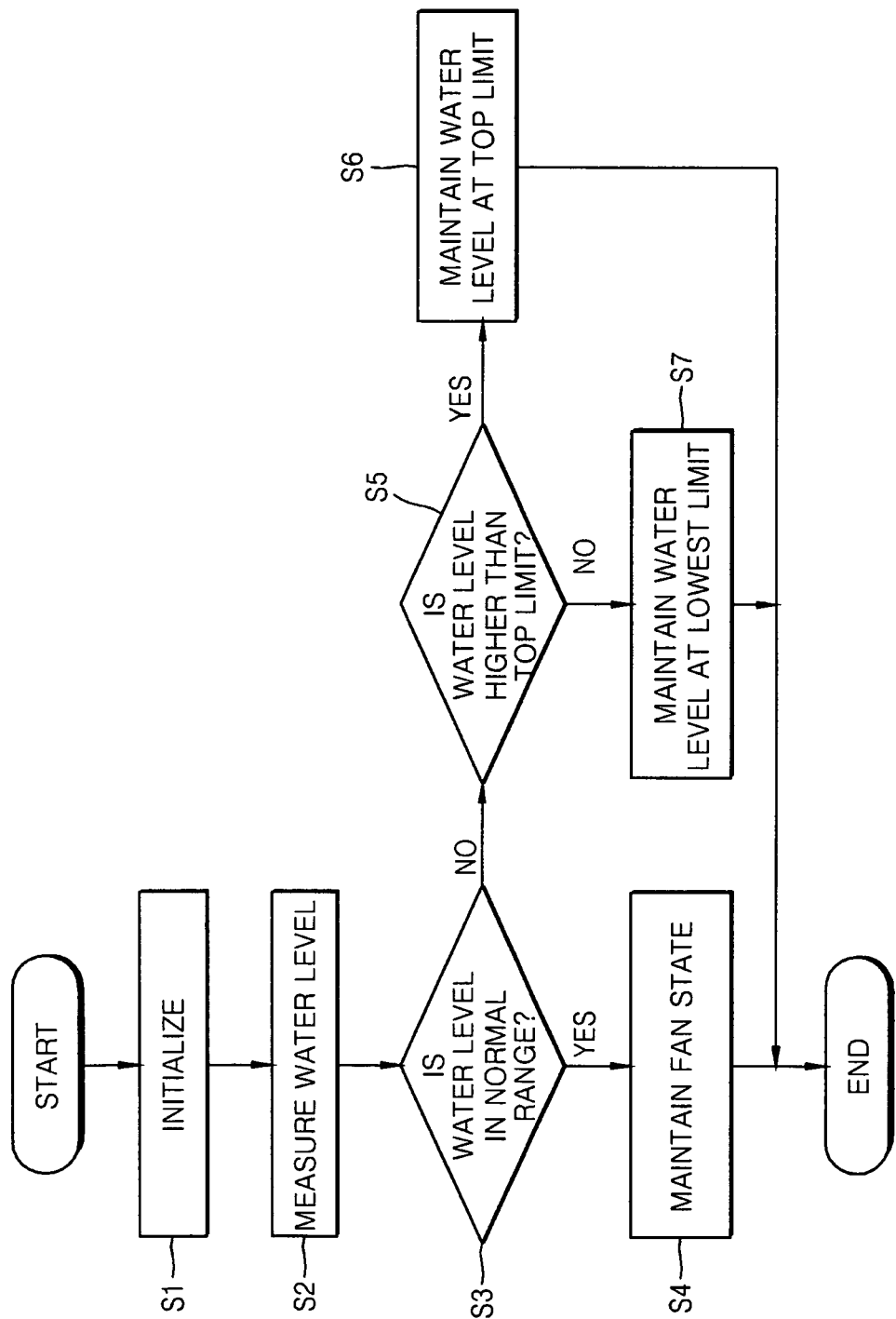
FIG. 9 illustrates a flowchart illustrating a method of measuring a water level in a recycler in a fuel cell, according to an embodiment of the present invention.

FIG. 9 is a flowchart illustrating a method of measuring a water level in the recycler 30 in a fuel cell, according to an exemplary embodiment.

Referring to FIG. 9, an initialization process is performed, in operation S1. After the initialization process, an amount of separated water, that is, a water level, is measured, in operation S2. Then, whether the measured water level is in a normal range is determined, in operation S3. If the water level is in the normal range, a fan state is maintained, in operation S4. The fan state denotes a state of a heat exchanger. If the water level is not in the normal range, whether the water level is higher than a given top limit or the amount of separated water is greater than a given amount is determined, in operation S5. The top limit of the separated water in the recycler 30 may be an amount of water that may be continuously supplied to stably maintain maximum output of the stack without exceeding the maximum capacity of water acceptable by the recycler 30. In operation S5, whether the water level is lower than a given lower limit amount or the amount of separated water is smaller than a given amount may be determined. The lower limit of the water separated in the recycler 30 may be an amount of water that may be continuously supplied to stably maintain minimum output of the stack. According to a capacity of the fuel cell, the top limit and the lower limit corresponding to the water separated in the recycler 30 may vary. Then, when it is determined in operation S5 that the water level is higher than the top limit, the water level is maintained to be at the top limit, in operation S6. In order to maintain the water level at the top limit, water above the top limit may be forcibly discharged. Then, operational performance of the fan may be decreased to reduce the amount of water separated in the recycler 30 to be below the top limit. When it is determined in operation S5 that the water level is lower than the lower limit, the lower limit of the water level is maintained, in operation S7. In order to maintain the water level at the lower limit, performance of the fan (i.e., the heat exchanger) may be increased.

Figure 10:
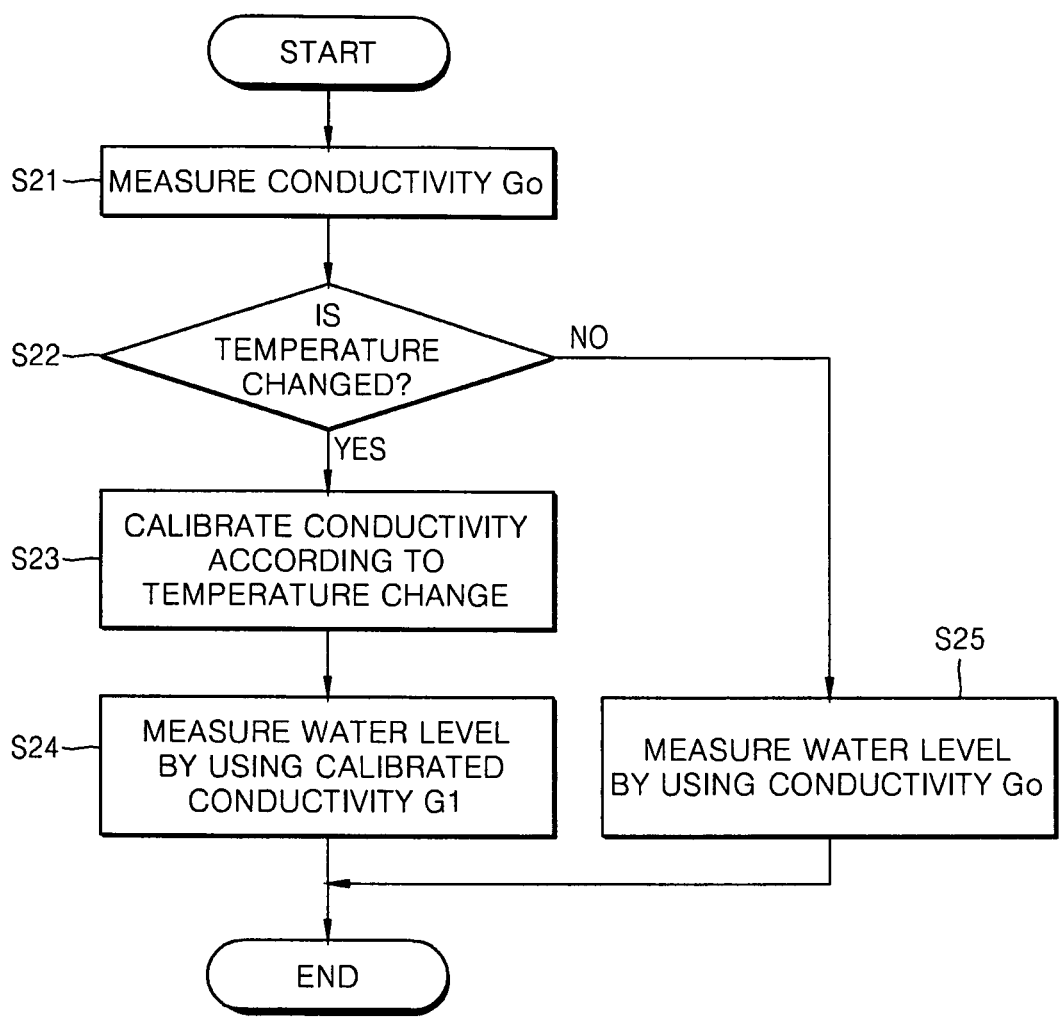
FIG. 10 illustrates a flowchart illustrating a process of measuring a water level included in the method of FIG. 9.

Operation S2 in which the water level is measured may be divided into processes illustrated in FIG. 10.

Referring to FIG. 10, operation S2 may include measuring a conductivity Go at a reference temperature To, in operation S21, determining whether the temperature of water separated in the recycler 30 is changed, in operation S22, calibrating the conductivity Go according to a temperature change, when the temperature is changed, in operation S23, and measuring a water level by using the calibrated conductivity G1, in operation S24. In the calibrating of the conductivity Go according to a temperature change, in operation S23, the conductivity G1 is calculated when the temperature is changed from a set reference temperature To to a temperature T1 and thus measuring the temperature T1 and comparing the measured temperature T1 with the set reference temperature To may be included. When the measured temperature T1 is different from the set reference temperature To according to the comparing process, the calibrated conductivity G1 may be calculated by using Formula 2 mentioned above.

As illustrated in FIG. 5, the measuring of the conductivity Go, in operation S21, may include applying a voltage Vc to the recycler 30, measuring an output voltage V0 of the recycler 30 according to the applied voltage Vc, measuring the set reference temperature To of the separated water, and calculating the conductivity Go by using Formula 1.

In the determining of whether the temperature of water separated in the recycler 30 is changed, in operation S22, when the temperature of the separated water is not changed (that is, when the temperature of water is maintained in an allowable range), a water level according to the calculated conductivity Go is measured, in operation S25.

The maintaining of the fan state, in operation S4, illustrated in FIG. 9, may include calculating a fan control signal from a proportional-integral (PI) controller and setting a fan driving signal by using the fan control signal calculated from the PI controller.

Also, the determining of whether the water level is higher than the given top limit or the amount of separated water is greater than the given amount, in operation S5, may include determining whether the calibrated conductivity G1 is greater than the conductivity at a set top limit, and when the calibrated conductivity G1 is lower than the conductivity at the set top limit, may further include determining whether the calibrated conductivity G1 is lower than the conductivity at a set lower limit.

As described above, according to the one or more of the above embodiments of the present invention, the fuel cell includes the recycler that is not affected by directivity of the fuel cell, temperature, and humidity. Thus, a recycled amount of water may be stably maintains within a fixed range. Accordingly, if the fuel cell is used in any device, concentration of fuel may be appropriately maintains in a fixed range and thereby, stability of operation of the fuel cell may be secured. Therefore, power may be stably generated.

It should be understood that the exemplary embodiments described therein should be considered in a descriptive sense only and not for purposes of limitation. Descriptions of features or aspects within each embodiment should typically be considered as available for other similar features or aspects in other embodiments.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A recycler of a fuel cell, the recycler comprising:
   first and second electrodes;
   a rotor interposed between the first and second electrodes;
   an insulating container surrounding and receiving the first and second electrodes and the rotor; and
   at least one of a cathode inlet and an anode inlet in the insulating container, the anode inlet providing by-product from an anode of the fuel cell to the recycler and the cathode inlet providing by-product from a cathode of the fuel cell to the recycler.

2. The recycler as claimed in claim 1, further comprising a container cover on the insulating container.

3. The recycler as claimed in claim 1, wherein the first and second electrodes are each formed of a conductive material.

4. A water management system, comprising: the recycler as claimed in claim 1;
   a heat exchanger configured to cool by-products generated during power generation of a stack to be supplied to the recycler; and
   a controller connected to the recycler and the heat exchanger.

5. The system as claimed in claim 4, wherein the controller comprises:
   a water level sensor configured to measure a conductivity of water separated in the recycler;
   a feedback controller configured to generate a driving signal to be supplied to the heat exchanger according to the measured conductivity of the water; and
   a fan driver configured to control a operation of the heat exchanger according to the driving signal generated by the feedback controller.

6. The system as claimed in claim 5, wherein the controller further comprises:
   a temperature sensor configured to measure a temperature of the water separated in the recycler; and
   a calibrator configured to calibrate the conductivity of the separated water according to the temperature measured by the temperature sensor.

7. A fuel cell, comprising:
   the water management system as claimed in claim 4;
   a stack connected to the water management system;
   a fuel supply system connected to the stack; and
   a fuel cartridge connected to the fuel supply system.

8. A circuit for measuring a water level of the recycler in the fuel cell, the circuit comprising:

the recycler as claimed in claim 1; and a load connected to the recycler and configured to provide a reference conductivity, wherein a first end of the load is connected to the first electrode of the recycler.

9. The circuit as claimed in claim 8, wherein a voltage is applied between a second end of the load and the second electrode of the recycler, and an output voltage is measured between the recycler and the load.

10. A method of measuring a water level of the recycler in the fuel cell, the method comprising:

measuring a conductivity of water separated in the recycler as claimed in claim 1; and measuring a water level according to the measured conductivity of the seperated water.

11. The method as claimed in claim 10, wherein the measuring of the conductivity of the seperated water comprises:

applying a voltage to the recycler;

measuring a set reference temperature of the water separated in the recycler and an output voltage according to the applied voltage; and calculating the conductivity of the water by using Formula 1 below. <Formula 1>

$$Go = Gr \times Vo/(Vc-Vo)$$

wherein, in Formula 1, Go is a conductivity of the seperated water, Gr is a reference conductivity, Vc is the applied voltage, and Vo is the output voltage of the recycler according to the applied voltage Vc.

12. The method as claimed in claim 11, wherein the measuring of the conductivity of the seperated water comprises:

measuring a temperature of the water seperated in the recycler; and calibrating the calculated conductivity of the seperated water by using Formula 2 below. <Formula 2>

$$G1 = k_t \times (T1-To) + Go$$

wherein, in Formula 2, G1 is a conductivity of seperated water at a temperature T1, $k_t$ is a temperature coefficient, T1 is the temperature of the separated water, and To is the reference temperature.

13. The recycler as claimed in claim 1, further comprising a liquid outlet in the insulating container, the liquid outlet discharging a liquid from the recycler.

14. The recycler as claimed in claim 1, wherein the first and second electrodes are spaced apart from the rotor.

15. The recycler as claimed in claim 1, wherein the first electrode and the second electrode each have a flat plate shape.

16. The recycler as claimed in claim 15, wherein the first electrode and the second electrode are disposed in planes below and above the rotor, respectively, the planes being normal to a rotation axis of the rotor.

17. The recycler as claimed in claim 2, further comprising a gas outlet in the container cover, the gas outlet discharging a gas from the recycler.

18. The recycler as claimed in claim 17, wherein the second electrode includes a hole therein, the hole in the second electrode being connected to the gas outlet in the container cover.

19. The recycler as claimed in claim 1, further comprising a motor, the motor rotating the rotor to separate liquid and gas in the recycler.

20. The recycler as claimed in claim 1, wherein:

the first electrode has a shape, a bottom surface of the insulating container has a shape, and the shape of the first electrode is the same as the shape of the bottom surface of the container.

* * * * *